United States Patent [19]
Zhang et al.

[11] Patent Number: 5,783,105
[45] Date of Patent: *Jul. 21, 1998

[54] OXYGEN GENERATING COMPOSITIONS

[75] Inventors: Yunchang Zhang; James C. Cannon, both of Overland Park, Kans.

[73] Assignee: Nellcor Puritan Bennett, Pleasanton, Calif.

[*] Notice: This patent issued on a continued prosecution application filed under 37 CFR 1.53(d), and is subject to the twenty year patent term provisions of 35 U.S.C. 154(a)(2).

[21] Appl. No.: 554,901

[22] Filed: Nov. 9, 1995

[51] Int. Cl.$^6$ .................. C01B 11/14; C01B 11/18; A62B 21/00; A62B 7/08
[52] U.S. Cl. .................. 252/187.31; 252/187.1; 422/126
[58] Field of Search .................. 252/187.31, 187.1; 422/126; 149/77, 108.2, 119

[56] References Cited

U.S. PATENT DOCUMENTS

| | | | |
|---|---|---|---|
| 3,293,187 | 12/1966 | Markowitz | 252/186.22 |
| 3,736,104 | 5/1973 | Churchill et al. | 422/120 |
| 3,955,931 | 5/1976 | Thompson | 422/165 |
| 4,073,741 | 2/1978 | Heintz | 252/186.21 |
| 4,490,274 | 12/1984 | Maslyaev et al. | 252/186.22 |
| 5,049,306 | 9/1991 | Greer | 252/187.31 |
| 5,198,147 | 3/1993 | Zhang et al. | 252/187.31 |
| 5,279,761 | 1/1994 | Zhang et al. | 252/187.31 |
| 5,298,187 | 3/1994 | Zhang et al. | 252/187.31 |
| 5,338,516 | 8/1994 | Zhang et al. | 422/126 |
| 5,376,352 | 12/1994 | Peters et al. | 423/579 |
| 5,429,691 | 7/1995 | Hinshaw et al. | 149/45 |
| 5,439,537 | 8/1995 | Hinshaw et al. | 149/22 |
| 5,482,579 | 1/1996 | Ochi et al. | 149/83 |

FOREIGN PATENT DOCUMENTS 1035248A  9/1989  China.

OTHER PUBLICATIONS

Aerospace standard, "Aviator's Breathing Oxygen Purity Standard" SAE AS8010 Rev. C (1977).
Puritan–Bennett Aero Systems Co.—Chemical Oxygen Generators for Aviation (1972).

*Primary Examiner*—Joseph D. Anthony
*Attorney, Agent, or Firm*—Fulwider Patton Lee & Utecht, LLP

[57] ABSTRACT

The oxygen generation compositions are tin fueled to produce a significantly lower carbon monoxide contamination of the breathable oxygen generated. The oxygen generating compositions comprise about 0.5–15% by weight of tin powder as a fuel and rheology modifier; from zero to about 15% by weight of a transition metal oxide catalyst; about 0.1–5% by weight of an alkaline compound as a chlorine remover and reaction rate modifier; and the remainder of an oxygen source selected from the group consisting of alkali metal chlorates, alkali metal perchlorates, and mixtures thereof. The oxygen generating composition can optionally further include up to about 5% of a binder. The oxygen generating compositions have a smoother, more uniform rate of oxygen generation, lower temperature sensitivity, and a lower operating temperature than comparable chlorate/perchlorate oxygen generation compositions utilizing iron powder as a fuel.

20 Claims, 1 Drawing Sheet

OXYGEN GENERATING COMPOSITIONS

BACKGROUND OF THE INVENTION

1. Field of the Invention

This invention relates generally to oxygen generating compositions, and more particularly concerns improved tin fueled oxygen generation compositions.

2. Description of Related Art

Chemical oxygen generating compositions based upon the decomposition of alkali metal chlorates or perchlorates have long been used as an emergency source of breathable oxygen, such as in passenger aircraft, for example. Oxygen generating compositions utilizing alkali metal chlorates or perchlorates are disclosed in U.S. Pat. Nos. 5,198,147; 5,279,761; and 5,298,187; each of which are incorporated herein by reference. While iron powder has commonly been used in chlorate or perchlorate compositions as a fuel or catalyst for decomposition of the chlorates or perchlorates to release oxygen, such iron fueled conventional alkali metal chlorate or perchlorate compositions typically can at times also contaminate the oxygen released with up to 1,000 ppm of carbon monoxide, which must be removed to provide a safely breathable gas.

The production of carbon monoxide by alkali metal chlorate or perchlorate compositions utilizing iron powder as a fuel can be explained by the fact that iron has a high affinity for carbon, and can form various compounds with carbon. Iron powder usually contains several hundred to several thousand ppm carbon. Upon oxidation of the iron powder in a chemical oxygen generator, part of the carbon content of the iron powder is converted to carbon monoxide at unacceptably unhealthy levels, so that the carbon monoxide must be removed from the oxygen produced. Carbon-free iron powder is difficult to obtain and expensive, so that in order to use iron powder as a fuel in an oxygen generator, it is necessary and economically preferable to utilize a filter to convert the carbon monoxide produced to the less toxic carbon dioxide. Unfortunately, the equipment necessary to filter and convert carbon monoxide to carbon dioxide not only increases manufacturing costs, but also increases the weight of an iron fueled oxygen generation system, which can be a considerable disadvantage if the oxygen generation system is to be used on board aircraft. It would therefore be desirable to provide oxygen generating compositions that can produce significantly reduced levels of carbon monoxide.

Higher temperatures of operation of oxygen generating compositions also increase the production of carbon monoxide, so that reducing the temperature of operation further helps to reduce production of carbon monoxide. Cooler operating temperatures for oxygen generation are also generally preferred because this reduces the potential for thermal damage to structures near the generator. It would therefore also be desirable to provide oxygen generating compositions that have a lower operating temperature than a comparable oxygen generation composition utilizing iron powder as a fuel.

Oxygen generating compositions are also commonly required to function within a wide range of environmental temperatures, as low as −30° and as high as 55° C., for example. Since the rate of decomposition of sodium chlorate is temperature dependent, an excess weight of the chemical oxygen generating composition is commonly used in order to insure that a sodium chlorate based composition will meet minimum oxygen generating specifications at both low and high temperatures. It would be desirable to provide oxygen generating compositions that are less temperature sensitive and can provide a more uniform rate of oxygen generation over an operating range of temperatures.

An aircraft oxygen generator is commonly preprogrammed according to the descent profile of a given type of airplane, and must meet the minimum oxygen flow requirement at all times during a descent. However, oxygen gas formed inside a chemical oxygen generation core or candle must develop sufficient pressure to escape from the core. This effect can cause an uneven and erratic flow of oxygen from an activated oxygen generation core. In order to meet minimum flow requirements despite such variations in oxygen flow from the core, excess weight of the chemical oxygen generating composition is commonly used. To minimize unnecessary weight, particularly in aircraft, it would be desirable to provide oxygen generating compositions that can facilitate the flow of oxygen from an activated oxygen generation core. The present invention meets these needs.

SUMMARY OF THE INVENTION

Briefly, and in general terms, the present invention provides for an improved tin powder fueled oxygen generation composition that produces a significantly lower carbon monoxide contamination of the oxygen generated, a smoother, more uniform rate of oxygen generation, lower temperature sensitivity, and a lower operating temperature than a comparable chlorate/perchlorate oxygen generation composition utilizing iron powder as a fuel.

The invention accordingly provides for an oxygen generating composition for producing a breathable gas upon ignition of the composition, comprising about 0.5–15% by weight of tin powder as a fuel and rheology modifier; from zero to about 15% by weight of a transition metal oxide catalyst; about 0.1–5% by weight of an alkaline compound as a chlorine remover and reaction rate modifier; and the remainder of an oxygen source selected from the group consisting of alkali metal chlorates, alkali metal perchlorates, and mixtures thereof. The oxygen generating composition can optionally further include up to about 5% of a binder. In one preferred embodiment, the oxygen generating composition can comprise about 1–10% by weight of tin powder as a fuel and rheology modifier; about 0.1–15% by weight of a transition metal oxide catalyst; about 0.5–4% by weight of an alkaline compound as a chlorine remover and reaction rate modifier; about 1–5% of a binder; and the remainder of an oxygen source selected from the group consisting of alkali metal chlorates, alkali metal perchlorates, and mixtures thereof.

The improved tin fueled oxygen generation compositions of the invention produce a significantly lower level of carbon monoxide contamination of oxygen generated, have a smoother, more uniform rate of oxygen generation, have a lower sensitivity to changes in temperature, and have a lower operating temperature than a comparable oxygen generation composition utilizing iron powder as a fuel.

Tin does not have as high an affinity for carbon as iron does, so that commercially available tin powder can be carbon-free, or can at least have a considerably lower carbon content than comparable, commercially available grades of iron powder. When such tin powder is used as a fuel in an oxygen generation system, the carbon monoxide level in the oxygen generated can be significantly reduced, when compared to carbon monoxide levels produced when iron powder is used as a fuel, as will be further explained hereinafter, due to the lower carbon content of the tin powder. The carbon monoxide level of oxygen generated in an oxygen generation system fueled with tin powder is in fact so low that it is not necessary to provide equipment for filtration and conversion of carbon monoxide, thereby reducing manufacturing costs and weight of such a tin fueled oxygen generation system, while improving the quality of the oxygen produced.

Tin metal powder is also a moderately active catalyst for the decomposition of sodium chlorate. However, the oxidation product, tin dioxide, $SnO_2$, has very little such catalytic activity. While increased temperatures increase the rate of decomposition of sodium chlorate, the rate of conversion of tin to tin dioxide also occurs more rapidly. Thus, the catalytic activity of tin is reduced at higher temperatures, offsetting the otherwise higher decomposition rates of sodium chlorate at higher temperatures, due to the conversion of tin to tin dioxide. This behavior of tin is advantageous, since an oxygen generator is commonly required to function within a wide range of environmental temperatures, such as between $-30°$ and $+55°$ C., for example. Since the rate of decomposition of sodium chlorate and the rate of conversion of tin to tin dioxide are both temperature dependent, the use of tin powder used as a catalyst for the decomposition of sodium chlorate has a moderating effect on the temperature sensitivity of the rate of oxygen generation of the sodium chlorate oxygen generating composition, allowing a smaller, lighter amount of the sodium chlorate oxygen generating composition to be used, which is an important consideration for use of an oxygen generating system for aircraft.

Furthermore, whereas iron melts at about $1,536°$ C., tin melts at about $232°$ C., so that tin can serve as a lubricant to assist the outflow of oxygen from the oxygen generating core, and to thus make the flow of oxygen gas out of the core more uniform. This allows for further weight reduction of the chemical oxygen generating system.

Tin is also a soft metal, with a hardness rating of 1.65 on the Moh's scale compared to that of 4.5 for iron, and can thus serve as a binder during formation of the chemical oxygen generating core.

Tin also generates about 1.1 Kcal/g upon oxidation, compared to about 1.7 Kcal/g for oxidation of iron. Because less heat is produced, tin fueled chemical oxygen generating systems can operate at a lower temperature than a comparable weight of an iron fueled composition. Since a higher temperature of operation favors the production of carbon monoxide, reducing the temperature of operation further helps to reduce production of carbon monoxide. Cooler oxygen generation is generally preferred, because this reduces the potential for thermal damage to structures near the generator.

These and other aspects and advantages of the invention will become apparent from the following detailed description, and the accompanying drawing, which illustrates by way of example the features of the invention.

DETAILED DESCRIPTION OF THE PREFERRED EMBODIMENTS

Figure 1:
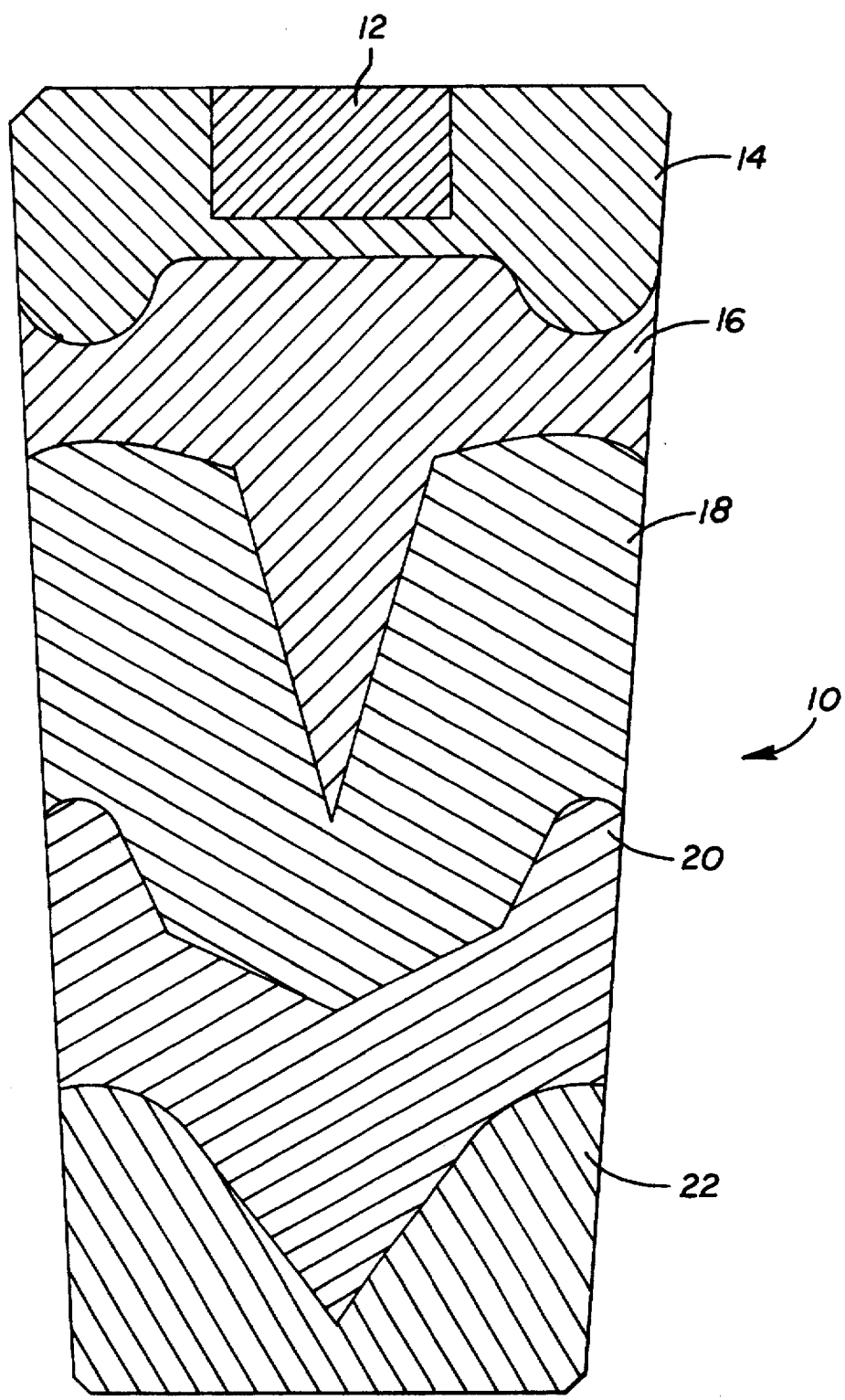
FIG. 1 is a cross sectional view of an oxygen generating candle formed from the oxygen generating composition according to the principles of the invention.

Iron fueled alkali metal chlorate or perchlorate compositions can release significant levels of carbon monoxide, which must be removed to provide a safely breathable gas. High temperatures of operation of oxygen generating compositions also increase the production of carbon monoxide. The equipment necessary to filter and convert carbon monoxide to carbon dioxide not only increases manufacturing costs, but also increases the weight of an iron fueled oxygen generation system. An excess weight of the chemical oxygen generating composition is commonly used in order to insure that a chlorate/perchlorate based composition will meet minimum oxygen generating specifications at both low and high temperatures. Flow of oxygen from an activated conventional oxygen generation core can also be uneven and erratic.

With reference to FIG. 1, the invention is embodied in an oxygen generating composition for producing a breathable gas upon ignition of the composition. The oxygen generating composition generally comprises about 0.5–15% by weight of tin powder as a fuel and rheology modifier. Tin powder having particle sizes less than 325 mesh, and a maximum dimension of less than approximately 44 microns, and with a purity of 99.0%, such as that supplied by SCM Metal Products, is suitable for use as an oxygen generation fuel according to the principles of the invention. Tin powder with a high purity and similarly small particle size, such as is available from Aldrich Chemical and Alfa Products, is also suitable. Tin powder with a particle size over 325 mesh can be used according to the principles of the invention, with a slightly higher loading than is set out in the examples provided below.

In a presently preferred embodiment, the oxygen generating composition further comprises about 0.1–15% by weight of a transition metal oxide catalyst. The transition metal oxide catalyst can, for example, be selected from the group consisting of oxides of cobalt such as CoO, $Co_3O_4$, $CO_2O_3$, and $CoO_x$, where x equals 1.0 to 1.5, nickel oxide, copper oxide, iron oxide, and mixtures thereof. The presently preferred transition metal oxide catalysts are cobaltocobaltic oxide ($Co_3O_4$), nickel oxide and copper oxide.

In a currently preferred embodiment, the oxygen generating composition further includes from about 0.1 to about 5% by weight of one or more alkaline compounds as a chlorine remover and reaction rate modifier. The alkaline compound can be a hydroxide, oxide, peroxide, superoxide, or carbonate of calcium, magnesium, lithium, or strontium. In one presently preferred embodiment, the alkaline compound can be calcium hydroxide, magnesium oxide (MgO), or lithium peroxide. Other alkaline compounds of lithium, sodium, potassium, rubidium, cesium, magnesium, calcium and strontium can also be employed as additives to smooth out the chlorate/perchlorate decomposition rate, and to suppress production of free chlorine. Examples of other alkaline compounds that may be suitable include, but are not limited to, barium peroxide, lithium aluminate, lithium carbonate, lithium borates, lithium phosphates, lithium silicates, strontium carbonate, strontium phosphate, sodium aluminate, sodium borates and sodium silicates.

The oxygen generating compositions of the invention can also optionally further include up to about 5% of one or more binders. In a presently preferred embodiment, the binder can be an inorganic binder such as glass powder, glass fiber, ceramic fiber, steel wool, bentonite, kaolinite and mixtures thereof, for example, although other inorganic binders can also be suitable. Particularly since tin can serve as a binder, the additional inorganic binder can be omitted, depending upon the specific uses and applications of the oxygen generating composition.

The remainder of the oxygen generating composition preferably comprises an oxygen source selected from the group consisting of alkali metal chlorates, alkali metal perchlorates, and mixtures thereof. The alkali metal chlorate can be sodium chlorate, potassium chlorate, or lithium chlorate, for example, and the alkali metal perchlorate can be potassium perchlorate, lithium perchlorate, or sodium perchlorate, for example, although other alkali metal chlorates and perchlorates may be suitable. The presently preferred chlorate is sodium chlorate, and the presently preferred perchlorate is potassium perchlorate. Sodium chlorate is presently preferred as an oxygen source because it has a relatively high oxygen yield per unit weight compared to potassium chlorate, and a reasonably low decomposition temperature compared to potassium chlorate and perchlorate and lithium perchlorate. Decomposition of sodium chlorate is exothermic once initiated, which permits a self-sustaining operation of an oxygen generating candle or core formed from the oxygen generating compositions of the invention. Sodium chlorate is also currently preferred as the oxygen source, due to its currently relatively low price. In one presently preferred aspect of the invention, the oxygen source can alternatively be a combination of a major amount of sodium chlorate and a minor amount of potassium perchlorate.

In one presently preferred embodiment of the invention, the oxygen generating composition can comprise about 1–10% by weight of tin powder as a fuel and rheology modifier; about 0.1–15% by weight of a transition metal oxide catalyst; about 0.5–4% by weight of an alkaline compound as a chlorine remover and reaction rate modifier; about 1–5% of a binder; and the remainder of an oxygen source selected from the group consisting of alkali metal chlorates, alkali metal perchlorates, and mixtures thereof.

In forming an oxygen generating core or candle, the tin powder, metal oxide catalyst, alkaline additive (if used) and the inorganic binder (if used) are premixed. The oxygen source chlorate/perchlorate component is typically separately mixed with approximately 1 to 5% water, by weight, which is used as a lubricant to facilitate the formation of the oxygen generating cores or candles. The premixed powder is then mixed with the wet chlorate/perchlorate. The chemical oxygen candles are formed by compaction of the damp mixture in a mold, and are then dried at about 120° C. to remove the water that was added during the mixing process. However, a small residue of water may remain in the oxygen generating composition even after drying.

With reference to FIG. 1, a typical chemical oxygen generating candle 10 commonly is composed of several layers, with each layer having a different formulation. The multiple layers with different formulations can thus be designed to match the desired oxygen generation rate, based upon specified requirements of the application, since different applications may have different oxygen generation rate requirements. While the oxygen generating candle shown in FIG. 1 has 5 layers, any number of layers can be used to form the oxygen generating candle. Tin powder is preferably used in at least one of the layers, and can be used in all of the layers, depending upon the application. The various types of interface shapes between layers, shown in FIG. 1, are used to help control the transition of the reaction as it progresses from one layer to another. The interface shapes and relative sizes and reactivities of the layers can be modified, depending upon the requirements of the specific applications of the oxygen generating candles. oxygen generation candles or cores are typically formed in a cylindrical shape with a taper. At the top of the candle there is a recess to hold an ignition pellet 12, which can be ignited by firing a percussion primer, for example. A typical ignition pellet can, for example, have a composition of about 35% by weight tin, 13–15% by weight cobalt oxide, about 5% iron oxide, about 3–4% by weight of a binder, and the balance sodium chlorate. The heat from the ignition pellet is then sufficient to initiate the decomposition of the layers 14, 16, 18, 20 and 22 of the oxygen generating candle to release oxygen.

The oxygen generating compositions of the invention are further illustrated in the following examples, in which percentages are by weight.

EXAMPLE 1

1st layer: 20 gram: 10% tin powder, 11% cobalt oxide, 1% bentonite, and 78% $NaClO_3$.

2nd layer: 63 gram: 5% tin powder, 1% $Ca(OH)_2$, 3.3% $Co_3O_4$, and 90.7% $NaClO_2$.

3rd layer: 70 gram: 4% tin powder, 1% $Ca(OH)_2$, 1.4% $Co_3O_4$, and 93.6% $NaClO_3$.

4th layer: 80 gram: 3% tin powder, 1% $Ca(OH)_2$, 0.8% $Co_3O_4$, 1.5% glass powder and 93.7% $NaClO_3$.

5th layer: 50 gram: 1.5% tin powder, 1% $Ca(OH)_2$, 0.6% $Co_3O_4$, 2.0% glass powder and 94.9% $NaClO_3$.

The powders for each layer were premixed without sodium chlorate, and then the premixed powders were mixed with sodium chlorate. A small amount of distilled water was used to wet each mixture. Chemical oxygen candles were then formed by compaction of the damp mixtures in a mold. The candles were then dried at 120° C. to remove the water added.

A dried candle was then loaded into a stainless steel housing, and ignited. The oxygen generating candle operated for 14.3 minutes and generated 85 liters of oxygen at room temperature. The reaction was uniform, and the expended candle had a uniform texture, indicative of a smooth reaction. The average carbon monoxide concentration of the released gas was 10 ppm without the use of any carbon monoxide filter.

EXAMPLE 2

1st layer: 20 gram: 10% tin powder, 11% cobalt oxide, 1.5% bentonite, and 77.5 $NaClO_3$.

2nd layer: 50 gram: 5% tin powder, 1% $Ca(OH)_2$, 3.0% cobalt oxide, 1.0% bentonite, and 90% $NaClO_3$.

3rd layer: 100 gram: 4.0% tin powder, 1.25% cobalt oxide, 1% $Ca(OH)_2$, and 93.75% $NaClO_3$.

4th layer: 113 gram: 2.5% tin powder, 0.4% cobalt oxide, 1% $Ca(OH)_2$, 2% glass powder and 94.1% $NaClO_3$.

The oxygen candle was formed using these mixtures according to the procedures used in Example 1. When ignited the candle burned smoothly for 18.6 minutes and generated 85.8 liters of oxygen at room temperature. The average carbon monoxide concentration was 11 ppm without using a carbon monoxide filter.

EXAMPLE 3

1st layer: 18 gram: 11% tin powder, 10% cobalt oxide, 3.0% glass powder, and 76% $NaClO_3$.

2nd layer: 52 gram: 6% tin powder, 2.9% cobalt oxide, 1% $Ca(OH)_2$, 2% glass powder, and 88.1% $NaClO_3$.

3rd layer: 80 gram: 4.0% tin powder, 1.2% cobalt oxide, 1% $Ca(OH)_2$, 2.1% glass powder, and 91.7% $NaClO_3$.

4th layer: 133 gram: 3% tin powder, 1.1% copper oxide, 1% $Ca(OH)_2$, 2% glass powder and 92.9% $NaClO_3$.

The oxygen generating core was formed using these mixtures according to the procedure of Example 1. When loaded in a stainless steel can and ignited, the core reacted 15.2 minutes, and generated 84.5 liters of oxygen.

EXAMPLE 4

1st layer: 17 gram: 9.5% tin powder, 9.5% cobalt oxide, 2% glass powder, and 79% $NaClO_3$.

2nd layer: 46 gram: 6% tin powder, 3.2% cobalt oxide, 1% $Ca(OH)_2$, 1.5% glass powder, and 88.3% $NaClO_3$.

3rd layer: 80 gram: 4.5% tin powder, 1.2% cobalt oxide, 1% $Ca(OH)_2$, 1.5% glass powder, and 91.8% $NaClO_3$.

4th layer: 140 gram: 3.3% tin powder, 0.9% copper oxide, 1% $Ca(OH)_2$, 1.5% glass powder, 5% $KClO_4$, and 88.3% $NaClO_3$.

The oxygen generating core was formed using these mixtures according to the procedure of Example 1. When loaded in a stainless steel can and ignited, the core reacted 13.6 minutes, and generated 84.9 liters of oxygen.

EXAMPLE 5

1st layer: 17 gram: 9.5% tin powder, 9.5% cobalt oxide, 2.0% glass powder, and 79% $NaClO_3$.

2nd layer: 46 gram: 6% tin powder, 1% $Ca(OH)_2$, 3.0% cobalt oxide, 1.5% glass powder, and 88.5% $NaClO_3$.

3rd layer: 70 gram: 4.8% tin powder, 1% $Ca(OH)_2$, 1.35% $Co_3O_4$, 1.5% glass powder, and 91.35% $NaClO_3$.

4th layer: 100 gram: 3.3% tin powder, 1% $Ca(OH)_2$, 0.63% $Co_3O_4$, 1.5% glass powder and 93.57% $NaClO_3$.

5th layer: 50 gram: 2.0% tin powder, 1.0% $Ca(OH)_2$, 0.55% $CI_3O_4$, 2.0% glass powder and 94.45% $NaClO_3$.

The oxygen generating candle was formed using these mixtures according to the procedure of Example 1. When ignited, the candle burned smoothly for 16.8 minutes and generated 85.0 liters of oxygen at room temperature. The average carbon monoxide concentration was 10 ppm without using a carbon monoxide filter. The reaction was uniform and the expended candle had a uniform texture, indicative of a smooth reaction.

EXAMPLE 6

1st layer: 17 gram: 9.5% tin powder, 9.5% cobalt oxide, 2% glass powder, and 79% $NaClO_3$.

2nd layer: 46 gram: 5.5% tin powder, 3.1% cobalt oxide, 1% $Ca(OH)_2$ and 90.4% $NaClO_3$.

3rd layer: 70 gram: 4.5% tin powder, 1.5% cobalt oxide, 1% $Ca(OH)_2$ and 93.0% $NaClO_3$.

4th layer: 150 gram: 3.3% tin powder, 1.8% copper oxide, 1% $Ca(OH)_2$, 1.5% glass powder and 92.4% $NaClO_3$.

The oxygen generating core was formed using these mixtures according to the procedure of Example 1. When ignited, the candle burned smoothly for 17.2 minutes, and generated 85.0 liters of oxygen at room temperature. The average carbon monoxide concentration was 11 ppm without using a carbon monoxide filter.

For purposes of comparison, an experimental lot of the tin fueled oxygen generating composition of the invention was pressed using tin powder in place of iron powder. Purity tests of the unfiltered gases generated from the tin powder fueled blocks were run and compared with purity test results of the unfiltered gases generated from iron powder fueled blocks. Both continuous trace and bag samples were tested. Ignition pellets made using tin powder in place of iron powder were used to ignite the tin powder fueled chemical cores in these purity tests. The results are compared in Table 1 below with the same blocks fueled with iron powder and ignited by iron powder fueled ignition pellets.

TABLE 1

| Fuel | Tin Powder | Iron Powder |
| --- | --- | --- |
| CO Spike (ppm) | 95 | >1000 |
| CO - 1st bag (ppm) | 43 | 378 |
| CO - 2nd bag (ppm) | 7 | 55 |
| CO - 3rd bag (ppm) | 5 | 12 |

A shown in Table 1, the carbon monoxide spike of greater than 1000 ppm (1000 ppm was the upper limit of the carbon monoxide monitor) of the iron powder fueled composition is dramatically reduced in the tin powder fueled composition to as low as 95 ppm. The carbon monoxide concentrations for the tin powder fueled composition in the first, second and third sample bags are also dramatically reduced compared with those of the iron powder fueled composition. On a time weighted average, the carbon monoxide concentration in the oxygen generated by the tin powder fueled cores is lower than 15 ppm carbon monoxide, so that no carbon monoxide filter would need to be used to provide breathable gas. This would reduce the weight of a chemical oxygen generator, and substantially reduce the cost of manufacture.

It will be apparent from the foregoing that while particular forms of the invention have been illustrated and described, various modifications can be made without departing from the spirit and scope of the invention. For instance, although water was utilized in forming the compositions in the examples above, it would be possible to suitably compress dry mixtures to form chemical cores. Furthermore, although the cores as illustrated are typically cylindrical with a taper, molds could be constructed in many other configurations. Accordingly, it is not intended that the invention be limited, except as by the appended claims.

What is claimed is:

1. An oxygen generating composition for producing breathable oxygen gas upon ignition of the composition, comprising:

about 0.5–15% by weight of substantially carbon-free tin powder as a fuel and rheology modifier;

from zero to about 15% by weight of a transition metal oxide catalyst; and the remainder substantially comprising an oxygen source selected from the group consisting of alkali metal chlorates, alkali metal perchlorates, and mixtures thereof, said composition being operable for producing breathable oxygen gas for a period of several minutes.

2. The oxygen generating composition of claim 1, wherein said transition metal oxide catalyst is selected from the group consisting of CoO, $Co_3O_4$, $Co_2O_3$, and $CoO_x$, where x equals 1.0 to 1.5, nickel oxide, copper oxide, iron oxide, and mixtures thereof.

3. The oxygen generating composition of claim 1, wherein said transition metal oxide catalyst is selected from the group consisting of cobalt oxide, nickel oxide and copper oxide.

4. The oxygen generating composition of claim 1, wherein said oxygen source is an alkali metal chlorate selected from the group consisting of sodium chlorate, potassium chlorate, lithium chlorate, and mixtures thereof.

5. The oxygen generating composition of claim 1, wherein said oxygen source is an alkali metal perchlorate selected from the group consisting of potassium perchlorate, lithium perchlorate, sodium perchlorate, and mixtures thereof.

6. The oxygen generating composition of claim 1, further comprising about 0.1–5% by weight of an alkaline compound as a chlorine remover and reaction rate modifier.

7. The oxygen generating composition of claim 6, wherein said alkaline compound is a metal oxide having an oxide moiety selected from the group consisting of a hydroxide, oxide, peroxide, superoxide, and carbonate and a metal selected from the group consisting of calcium, magnesium, lithium, and strontium.

8. The oxygen generating composition of claim 6, wherein said alkaline compound is selected from the group consisting of calcium hydroxide, magnesium oxide, and lithium peroxide.

9. The oxygen generating composition of claim 1, further comprising from zero to about 5% of an optional binder.

10. The oxygen generating composition of claim 9, wherein said binder is an inorganic binder selected from the group consisting of glass powder, glass fiber, ceramic fiber, steel wool, bentonite, kaolinite and mixtures thereof.

11. An oxygen generating composition for producing breathable oxygen gas upon ignition of the composition, comprising:

about 0.5–15% by weight of substantially carbon-free tin powder as a fuel and rheology modifier; and the remainder of an oxygen source selected from the group consisting of alkali metal chlorates, alkali metal perchlorates, and mixtures thereof, said composition being operable for producing breathable oxygen gas for a period of several minutes.

12. An oxygen generating composition for producing breathable oxygen gas upon ignition of the composition, comprising:

about 0.5–15% by weight of substantially carbon-free tin powder as a fuel and rheology modifier;

about 0.1–5% by weight of an alkaline compound as a chlorine remover and reaction rate modifier; and the remainder of an oxygen source selected from the group consisting of alkali metal chlorates, alkali metal perchlorates, and mixtures thereof, said composition being operable for producing breathable oxygen gas for a period of several minutes.

13. An oxygen generating composition for producing breathable oxvgen gas upon ignition of the composition, comprising:

about 1–10% by weight of substantially carbon-free tin powder as a fuel and rheology modifier;

about 0.1–15% by weight of a transition metal oxide catalyst;

about 0.5–4% by weight of an alkaline compound as a chlorine remover and reaction rate modifier;

about 1–5% of an optional binder; and the remainder of an oxygen source selected from the group consisting of alkali metal chlorates, alkali metal perchlorates, and mixtures thereof, said composition being operable for producing-breathable oxgen gas for a period of several minutes.

14. The oxygen generating composition of claim 13, wherein said transition metal oxide catalyst is selected from the group consisting of $CoO$, $Co_3O_4$, $Co_2O_3$, and $CoO_x$, where x equals 1.0 to 1.5, nickel oxide, copper oxide, iron oxide, and mixtures thereof.

15. The oxygen generating composition of claim 13, wherein said transition metal oxide catalyst is selected from the group consisting of cobalt oxide, nickel oxide and copper oxide.

16. The oxygen generating composition of claim 13, wherein said oxygen source is an alkali metal chlorate selected from the group consisting of sodium chlorate, potassium chlorate, lithium chlorate, and mixtures thereof.

17. The oxygen generating composition of claim 13, wherein said oxygen source is an alkali metal perchlorate selected from the group consisting of potassium perchlorate, lithium perchlorate, sodium perchlorate, and mixtures thereof.

18. The oxygen generating composition of claim 13, wherein said alkaline compound is a metal oxide having an oxide moiety selected from the group consisting of a hydroxide, oxide, peroxide, superoxide, and carbonate and a metal selected from the group consisting of calcium, magnesium, lithium, and strontium.

19. The oxygen generating composition of claim 13, wherein said alkaline compound is selected from the group consisting of calcium hydroxide, magnesium oxide, and lithium peroxide.

20. The oxygen generating composition of claim 13, wherein said binder is an inorganic binder selected from the group consisting of glass powder, glass fiber, ceramic fiber, steel wool, bentonite, kaolinite and mixtures thereof.

* * * * *

UNITED STATES PATENT AND TRADEMARK OFFICE
CERTIFICATE OF CORRECTION

PATENT NO. : 5,783,105
DATED : Jul. 21, 1998
INVENTOR(S) : Yunchang Zhang, James C. Cannon It is certified that error appears in the above-identified patent and that said Letters Patent is hereby corrected as shown below:

Column 6, Line 17, after 90.7%, change "NaClO$_2$", to read --NaClO$_3$--.

Signed and Sealed this

Twenty-second Day of September, 1998

Attest:

BRUCE LEHMAN

Attesting Officer      Commissioner of Patents and Trademarks